(12) United States Patent
Nunome et al.

(10) Patent No.: US 12,441,880 B2
(45) Date of Patent: *Oct. 14, 2025

(54) POLY(ESTER)CARBONATE AND METHOD FOR PRODUCING POLY(ESTER)CARBONATE

(71) Applicant: TEIJIN LIMITED, Osaka (JP)

(72) Inventors: Kazunori Nunome, Osaka (JP); Manabu Matsui, Osaka (JP); Takatsune Yanagida, Osaka (JP); Kazuyoshi Ogasawara, Osaka (JP); Keisuke Sato, Osaka (JP); Kyosuke Yamada, Osaka (JP); Tatsuya Oyama, Osaka (JP)

(73) Assignee: TEIJIN LIMITED, Osaka (JP)

( * ) Notice: Subject to any disclaimer, the term of this patent is extended or adjusted under 35 U.S.C. 154(b) by 173 days.

This patent is subject to a terminal disclaimer.

(21) Appl. No.: 17/978,550

(22) Filed: Nov. 1, 2022

(65) Prior Publication Data

US 2023/0051676 A1 Feb. 16, 2023

Related U.S. Application Data

(63) Continuation of application No. 16/957,470, filed as application No. PCT/JP2018/048056 on Dec. 27, 2018, now Pat. No. 11,505,698.

(30) Foreign Application Priority Data

Dec. 28, 2017 (JP) .................................. 2017-253843
Dec. 28, 2017 (JP) .................................. 2017-253844

(51) Int. Cl.
| | | |
|---|---|---|
| *C08G 63/64* | (2006.01) | |
| *C08G 63/84* | (2006.01) | |
| *C08G 63/87* | (2006.01) | |
| *C08G 64/06* | (2006.01) | |
| *C08G 64/30* | (2006.01) | |
| *C08L 69/00* | (2006.01) | |
| *G02B 1/04* | (2006.01) | |

(52) U.S. Cl.
CPC ............ *C08L 69/005* (2013.01); *C08G 63/64* (2013.01); *C08G 63/84* (2013.01); *C08G 63/87* (2013.01); *C08G 64/06* (2013.01); *C08G 64/30* (2013.01); *C08G 64/305* (2013.01); *C08G 64/307* (2013.01); *G02B 1/041* (2013.01)

(58) Field of Classification Search
None
See application file for complete search history.

(56) References Cited

U.S. PATENT DOCUMENTS

| | | | |
|---|---|---|---|
| 5,545,710 A * | 8/1996 | Haese | G02B 1/04 528/196 |
| 5,608,027 A * | 3/1997 | Crosby | C08K 3/32 528/196 |
| 6,565,974 B1 | 5/2003 | Uchiyama et al. | |
| 11,505,698 B2 * | 11/2022 | Nunome | G02B 1/04 |
| 2004/0058805 A1 | 3/2004 | Nakajima et al. | |
| 2007/0106055 A1* | 5/2007 | Kageyama | C08G 63/87 528/274 |
| 2007/0149757 A1* | 6/2007 | Nakajima | C08G 63/84 528/274 |
| 2012/0123083 A1 | 5/2012 | Nunome et al. | |
| 2013/0231435 A1 | 9/2013 | Hironaka et al. | |
| 2015/0285954 A1 | 10/2015 | Ishizuka et al. | |
| 2016/0319069 A1 | 11/2016 | Shigematsu et al. | |
| 2017/0044312 A1 | 2/2017 | Kato et al. | |
| 2019/0055351 A1 | 2/2019 | Kato et al. | |
| 2019/0241703 A1 | 8/2019 | Kato et al. | |
| 2021/0147621 A1* | 5/2021 | Yamada | C08G 64/02 |

FOREIGN PATENT DOCUMENTS

| | | |
|---|---|---|
| CN | 104769007 | 7/2015 |
| JP | 06329783 | * 11/1994 |
| JP | 07026005 | 1/1995 |
| JP | 2001-131276 | 5/2001 |
| JP | 2004-523613 | 8/2004 |
| JP | 2005060541 | 3/2005 |
| JP | 2006-028323 | 2/2006 |
| JP | 2006176572 | * 7/2006 |
| JP | 2012-214803 | 11/2012 |
| JP | 2013-523927 | 6/2013 |
| JP | 2017-179323 | 10/2017 |
| WO | 02/22707 | 3/2002 |
| WO | 02/055583 | 7/2002 |
| WO | 2011/010741 | 1/2011 |
| WO | 2011/120921 | 10/2011 |
| WO | 2012/099261 | 7/2012 |
| WO | 2014/054710 | 4/2014 |
| WO | 2015/170691 | 11/2015 |

OTHER PUBLICATIONS

International Search Report issued Mar. 26, 2019 in International (PCT) Patent Application No. PCT/JP2018/048056.

* cited by examiner

*Primary Examiner* — David J Buttner
(74) *Attorney, Agent, or Firm* — Wenderoth, Lind & Ponack, L.L.P.

(57) ABSTRACT

An object of the present invention is to provide a novel production method of a poly(ester)carbonate.
The present invention relates to a production method of a poly(ester)carbonate, including subjecting a diol and a carbonate ester to a transesterification reaction in the presence of a catalyst, wherein the catalyst comprises aluminum or a compound thereof, and a phosphorus compound.

5 Claims, No Drawings

POLY(ESTER)CARBONATE AND METHOD FOR PRODUCING POLY(ESTER)CARBONATE

FIELD

The present invention relates to a poly(ester)carbonate and a production method of a poly(ester)carbonate.

BACKGROUND

An imaging module is used in a camera, a video camera or mobile phone with a camera, a video phone or door phone with a camera, etc. in recent years, among others, miniaturization is required of an optical system used for the imaging module. When the optical system is miniaturized, chromatic aberration of the optical system presents a major problem. It is therefore known that the chromatic aberration can be corrected by combining an optical lens material configured to exhibit high dispersion by increasing the refractive index of an optical lens and reducing the Abbe number and an optical lens material configured to exhibit low dispersion by reducing the refractive index and increasing the Abbe number.

The glass conventionally used as a material of the optical system can realize various optical properties required and has excellent environmental resistance, but there was a problem of poor processability. To cope with this problem, a resin that is inexpensive compared with a glass material and has excellent processability is used for optical components. In particular, a polyester carbonate having a fluorene skeleton or a binaphthalene skeleton is used for the reason that the resin has high refractive index.

For example, Patent Literature 1 discloses a polyester carbonate containing a fluorene-based component unit, and Patent Literature 2 discloses a polyester carbonate containing a fluorene-based component unit and a binaphthalene-based component unit. In these literatures, an alkali metal, an alkaline earth metal, a transition metal, and a metal component including metals of Groups 13 to 15 of the periodic table are recited as the catalyst for a transesterification reaction to produce a polyester carbonate.

In addition, as for the production method of a polycarbonate, a method of polycondensing a carbonate ester such as diphenyl carbonate and a diol by a transesterification reaction is known. In Patent Literature 3, a phosphonium compound and an ammonium compound are recited as the catalyst for such a transesterification reaction.

Furthermore, Patent Literature 4 discloses a polycarbonate for optical use obtained by a transesterification reaction of a polycarbonate ester and a fluorene-based dihydroxy compound. In Patent Literature 4, as the reaction catalyst thereof, various catalysts such as metal compounds of Groups 1 and 2 of the periodic table, a basic boron compound, a basic phosphorus compound, a basic ammonium compound, and an amine-based compound, etc. are disclosed.

Incidentally, in Patent Literatures 5 and 6, a catalyst comprising aluminum or a compound thereof, and a phosphorus compound is disclosed as the catalyst for a polycondensation reaction to produce a polyester such as polyethylene terephthalate.

CITATION LIST

Patent Literature

PTL 1: international Publication WO2011/010741
PTL 2: Japanese Unexamined Patent Publication No. 2017-179323
PTL3: Japanese Unexamined Patent Publication No. 2013-523927
PTL4: Japanese Unexamined Patent Publication No. 2012-214803
PTL5: Japanese Unexamined Patent Publication No. 2001-131276
PTL6: International Publication WO2002/022707

SUMMARY

Technical Problem

An object of the present invention is to provide a novel production method of a poly(ester)carbonate and a novel poly(ester)carbonate obtained by the method.

Solution to Problem

The present inventors have found that the above-described problems can be solved by the present invention having the following aspects.

<<Aspect 1>>
A production method of a poly(ester)carbonate, including subjecting a diol and a carbonate ester to a transesterification reaction in the presence of a catalyst, wherein the catalyst comprises aluminum or a compound thereof, and a phosphorus compound.

<<Aspect 2>>
The production method according to aspect 1, wherein the phosphorus compound is one compound or two or more compounds selected from the group consisting of a phosphonic acid-based compound, a phosphinic acid-based compound, a phosphine oxide-based compound, a phosphonous acid-based compound, a phosphinous acid-based compound, and a phosphine-based compound.

<<Aspect 3>>
The production method according to aspect 1 or 2, wherein the aluminum or a compound thereof is an aluminum salt, an aluminum alkoxide, or an aluminum chelate compound.

<<Aspect 4>>
The production method according to any one of aspects 1 to 3, wherein the carbonate ester is diphenyl carbonate.

<<Aspect 5>>
The production method according to any one of aspects 1 to 4, wherein the catalyst is used in an amount of $8\times10^{-5}$ mol or more and $1\times10^{-3}$ mol or less per mol of the total of all monomer units used.

<<Aspect 6>>
The production method according to any one of aspects 1 to 5, wherein the poly(ester)carbonate contains 50 mol % or more of a stereostructural component unit based on all units and the stereostructural component unit contains 4 or more aromatic groups selected from the group consisting of a monocyclic aromatic group and a fused polycyclic aromatic group or contains 2 or more fused polycyclic aromatic groups.

<<Aspect 7>>
The production method according to aspect 6, wherein the stereostructural component unit has a fluorene-based component unit and/or a binaphthyl-based component unit.

<<Aspect 8>>
A poly(ester)carbonate containing 50 mol % or more of a stereostructural component unit based on all units, wherein the stereostructural component unit contains 4 or more aromatic groups selected from the group consisting of a monocyclic aromatic group and a fused polycyclic aromatic group or contains 2 or more fused polycyclic aromatic groups, the specific viscosity measured for a solution prepared by dissolving the polymer at 0.52 mass % in methylene chloride (a solution prepared by dissolving 0.7 g of the polymer in 100 ml of methylene chloride) is from 0.12 to 0.40, and the b* value of CIE1976 (L*a*b*) color system measured for a solution prepared by dissolving the polymer at 13 mass % in methylene chloride (a solution prepared by dissolving 1.0 g of the polymer in 5 ml of methylene chloride) is 4.0 or less.

<<Aspect 9>>

The poly(ester)carbonate according to aspect 8, wherein the stereostructural component unit has a fluorene-based component unit and/or a binaphthyl-based component unit.

<<Aspect 10>>

The poly(ester)carbonate according to aspect 8 or 9, which contains 70 mol % or more of the stereostructural component unit based on all units.

<<Aspect 11>>

The poly(ester)carbonate according to any one of aspects 8 to 10, wherein the refractive index nD is 1.650 or more.

<<Aspect 12>>

The poly(ester)carbonate according to any one of aspects 8 to 11, which is substantially free of titanium, germanium, antimony and tin.

<<Aspect 13>>

An optical member containing the poly(ester)carbonate according to any one of aspects 8 to 12.

<<Aspect 14>>

The optical member according to aspect 13, which is an optical lens.

<<Aspect 15>>

Use of a catalyst comprising aluminum or a compound thereof, and a phosphorus compound as a poly(ester)carbonate polymerization catalyst.

DESCRIPTION OF EMBODIMENTS

<<Production Method of Poly(ester)carbonate>>

The production method of a poly(ester)carbonate of the present invention includes performing polymerization by subjecting a diol, a carbonate ester, and optionally a dicarboxylic acid or an ester-forming derivative thereof to a transesterification reaction in the presence of the following catalyst.

<Polymerization Catalyst>

The catalyst used in the production method of the present invention is a poly(ester)carbonate polymerization catalyst for polymerizing a poly(ester)carbonate by transesterification and comprises aluminum or a compound thereof, and a phosphorus compound. Incidentally, in the present description, the "poly(ester)carbonate" means either one or both of a polycarbonate and a polyester carbonate. The present invention also relates to use of a catalyst comprising aluminum or a compound thereof, and a phosphorus compound as a poly(ester)carbonate polymerization catalyst.

The present inventors have found that a catalyst comprising aluminum or a compound thereof, and a phosphorus compound, which is known in the polycondensation reaction of a polyester such as polyethylene terephthalate, is very useful in the polymerization reaction for producing a poly(ester)carbonate. It has not been a conventional practice to use a common catalyst in the polycondensation reaction for producing a polyester such as polyethylene terephthalate and in the polymerization reaction for producing a poly(ester)carbonate. Accordingly, the fact that the catalyst above is useful in the polymerization reaction for producing a poly(ester)carbonate was an unexpected finding.

In addition, the poly(ester)carbonate obtained using such a catalyst has been found to have very high transparency. The reason therefor is considered as follows. The polymerization reaction of a poly(ester)carbonate is usually performed at a high temperature of 250° C. or more, and as the polymerization proceeds, the resin tends to be yellowed due to thermal decomposition induced by the high temperature, because the polymerization catalyst of the conventional technique promotes not only the polymerization reaction but also the thermal decomposition reaction of a poly(ester)carbonate. On the other hand, the catalyst of the present invention does not promote the thermal decomposition reaction of a poly(ester)carbonate while promoting the polymerization reaction.

The catalyst of the present invention may be used in an amount of $8 \times 10^{-5}$ mol or more, $9 \times 10^{-5}$ mol or more, $1 \times 10^{-4}$ mol or more, $3 \times 10^{-4}$ mol or more, $5 \times 10^{-4}$ mol or more, or $1 \times 10^{-3}$ mol or more, and in an amount of $1 \times 10^{-1}$ mol or less, $5 \times 10^{-2}$ mol or less, $1 \times 10^{-2}$ mol or less, $5 \times 10^{-3}$ mol or less, $1 \times 10^{-3}$ mol or less, $8 \times 10^{-4}$ mol or less, or $6 \times 10^{-4}$ mol or less, per mol of the total of all monomer units used. Accordingly, the catalyst of the present invention can be used in a very large amount, compared with the amount of the polyester polymerization catalyst (about $7.5 \times 10^{-5}$ mol) of Patent Literatures 5 and 6.

<Polymerization Catalyst—Aluminum or Compound Thereof>

The aluminum or a compound thereof used in the catalyst of the present invention can have by itself a certain level of catalytic activity as a catalyst for polymerizing a poly(ester)carbonate by transesterification. The aluminum or a compound thereof includes, for example, metallic aluminum, an aluminum salt, an aluminum chelate compound, an organic aluminum compound, and an inorganic aluminum compound, etc.

The aluminum salt includes organic and inorganic acid salts of aluminum. The organic acid salt of aluminum includes, for example, an aluminum carboxylate and, specifically, includes aluminum formate, aluminum acetate, aluminum propionate, aluminum oxalate, aluminum acrylate, aluminum laurate, aluminum stearate, aluminum benzoate, aluminum trichloroacetate, aluminum lactate, aluminum citrate, and aluminum salicylate. The inorganic acid salt of aluminum includes, for example, aluminum chloride, aluminum hydroxide, aluminum hydroxychloride, aluminum carbonate, aluminum phosphate, and aluminum phosphonate.

The aluminum chelate compound includes, for example, aluminum acetylacetonate, aluminum acetylacetate, aluminum ethylacetoacetate, and aluminum ethylacetoacetate diisopropoxide.

The organic aluminum compound includes an aluminum alkoxide, for example, trialkylaluminum, dialkylaluminum alkoxide, alkylaluminum dialkoxide, aluminum trialkoxide, and hydrolysates thereof, etc. and, specifically, includes an aluminum alkoxide such as aluminum methoxide, aluminum ethoxide, aluminum n-propoxide, aluminum iso-propoxide, aluminum n-butoxide and aluminum tert-butoxide, trimethylaluminum, triethylaluminum, and hydrolysates thereof. The inorganic aluminum compound includes aluminum oxide, etc.

In particular, a carboxylate, inorganic acid salt and chelate compound of aluminum are preferred, and among these, aluminum acetate, aluminum chloride, aluminum hydroxide, aluminum hydroxychloride, and aluminum acetylacetonate are more preferred.

<Polymerization Catalyst—Phosphorus Compound>

The phosphorus compound used in the catalyst of the present invention can enhance the catalytic activity of aluminum or a compound thereof in the polymerization reaction of a poly(ester)carbonate. Although not to be bound by theory, it is believed that the phosphorus compound can prevent the catalytic activity of aluminum or a compound thereof from being deactivated by an alcohol or water present in the reaction system.

The phosphorus compound includes, for example, a phosphonic acid-based compound, a phosphinic acid-based compound, a phosphine oxide-based compound, a phosphonous acid-based compound, a phosphinous acid-based compound, and a phosphine-based compound. Among these, the phosphorus compound particularly includes a phosphonic acid-based compound, a phosphinic acid-based compound, and a phosphine oxide-based compound, and more particularly includes a phosphonic acid-based compound.

The phosphonic acid-based compound as used herein indicates a compound having the following structure.

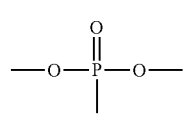

(P1)

The phosphonic acid-based compound includes, for example, dimethyl methylphosphonate, diethyl methylphosphonate, dihexyl methylphosphonate, dioctyl methylphosphonate, diphenyl methylphosphonate, dimethyl phenylphosphonate, diethyl phenylphosphonate, dihexyl phenylphosphonate, dioctyl phenylphosphonate, diphenyl phenylphosphonate, dimethyl benzylphosphonate, diethyl benzylphosphonate, dihexyl benzylphosphonate, dioctyl benzylphosphonate, diphenyl benzylphosphonate, dimethyl p-methylbenzylphosphonate, diethyl p-methylbenzylphosphonate, dihexyl p-methylbenzylphosphonate, dioctyl p-methylbenzylphosphonate, diphenyl p-methylbenzylphosphonate, dimethyl 3,5-di-tert-butyl-4-hydroxybenzylphosphonate, diethyl 3,5-di-tert-butyl-4-hydroxybenzylphosphonate, dihexyl 3,5-di-tert-butyl-4-hydroxybenzylphosphonate, dioctyl 3,5-di-tert-butyl-4-hydroxybenzylphosphonate, diphenyl 3,5-di-tert-butyl-4-hydroxybenzylphosphonate, etc.

The phosphinic acid-based compound indicates a compound having the following structure.

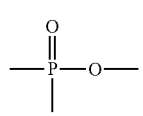

(P2)

The phosphinic acid-based compound includes, for example, diphenylphosphinic acid, methyl diphenylphosphinate, phenyl diphenylphosphinate, phenylphosphinic acid, methyl phenylphosphinate, phenyl phenylphosphinate, etc.

The phosphine oxide-based compound indicates a compound having the following structure.

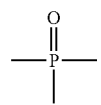

(P3)

The phosphine oxide-based compound includes, for example, diphenylphosphine oxide, methyldiphenylphosphine oxide, triphenylphosphine oxide, etc.

The phosphonous acid-based compound indicates a compound having the following structure.

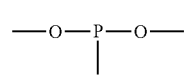

(P4)

The phosphonous acid-based compound includes, for example, dimethyl phosphonite, diethyl phosphonite, dipropyl phosphonite, dibutyl phosphonite, diphenyl phosphonite, etc.

The phosphinous acid-based compound indicates a compound having the following structure.

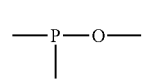

(P5)

The phosphonous acid-based compound includes, for example, hydroxyphosphine, methyl dibutylphosphinite, propyl diphenylphosphinite, methoxydiphenylphosphine, ethoxydiphenylphosphine, etc.

The phosphine-based compound indicates a compound having the following structure.

(P6)

The phosphine-based compound includes, for example, trimethylphosphine, triethylphosphine, methyldibutylphosphine, phenylisopropylphosphine, etc.

Among these phosphorus compounds, a phosphorus compound having an aromatic ring is preferred, and a phosphonic acid-based compound having an aromatic ring structure is more preferred.

The phosphorus compound may also be a compound represented by the following formulae (P7) to (P9):

$$P(=O)R^o(OR^p)(OR^q) \tag{P7}$$

$$P(=O)R^oR^r(OR^p) \tag{P8}$$

$$P(=O)R^oR^sR^t \tag{P9}$$

(in formulae (P7) to (P9), each of $R^o$, $R^r$, $R^s$ and $R^t$ independently represents hydrogen atom or a hydrocarbon group having a carbon number of 1 to 50 or a carbon number of 1 to 20, which may contain a hydroxyl group, a halogen group, an alkoxy group or an amino group and may have an alicyclic structure or an aromatic ring structure; and each of $R^p$ and $R^q$ independently represents hydrogen or a hydrocarbon group having a carbon number of 1 to 10 or a carbon number of 1 to 5).

In the formulae above, $R^o$, $R^r$, $R^s$ and/or $R^t$ preferably has an aromatic ring, particularly a benzyl group. In addition, $R^p$ and $R^q$ are preferably hydrogen or a hydrocarbon group having a carbon number of 1 to 3.

As for the amount of the phosphorus compound used, the compound is preferably used in a ratio of $5\times10^{-5}$ to $2\times10^{-3}$ mol, more preferably used in a ratio of $1\times10^{-4}$ to $1\times10^{-3}$ mol, still more preferably used in a ratio of $2\times10^{-4}$ to $8\times10^{-4}$ mol, per mol of the total of all monomer units used. The amount of the phosphorus compound used may be $1\times10^{-5}$ mol or more, $5\times10^{-5}$ mol or more, $1\times10^{-4}$ mol or more, or $5\times10^{-4}$ mol or more, and may be $1\times10^{-2}$ mol or less, $5\times10^{-3}$ mol or less, $1\times10^{-3}$ mol or less, or $5\times10^{-4}$ mol or less, per mol of the total of all monomer units used.

The ratio of the amount of the phosphorus compound used to the amount of aluminum or a compound thereof used may be 0.1 or more, 0.5 or more, 0.7 or more, 1.0 or more, or 1.5 or more, and may be 20 or less, 10 or less, 8.0 or less, 6.0 or less, 5.0 or less, 4.0 or less, or 3.0 or less. The ratio above is preferably from 0.5 to 10, more preferably from 1 to 5, still more preferably from 1.5 to 3.

<Polymerization Catalyst—Other Components>

The catalyst of the present invention may be used in combination with a catalyst that is well-known in conventional techniques as a poly(ester)carbonate polymerization catalyst for polymerizing a poly(ester)carbonate by transesterification.

<Polymerization Reaction>

In the case where a dicarboxylic acid or an ester-forming derivative thereof is used as part of raw materials, the method of the present invention is a production method of a polyester carbonate. This transesterification reaction is usually performed by the melt polymerization method. In the method of the present invention, a known method described, for example, in Patent Literature 1 can be used except for using the above-described catalyst.

The transesterification reaction is performed by mixing a diol and a carbonate ester under heating in the presence of an inert gas and distilling off the produced hydroxy compound such as phenol. The reaction temperature varies depending on the diol used but is usually from 120 to 350° C., preferably from 150 to 300° C., more preferably from 180 to 270° C. In the later stage of the reaction, the pressure in the system may be reduced to approximately from 1,000 to 1 Pa to facilitate the distilling-off of a hydroxy compound. The reaction time is usually on the order of 1 to 8 hours.

Furthermore, in the case of a polyester carbonate, it is preferred that a diol and a dicarboxylic acid or an ester-forming derivative thereof are mixed and reacted usually at 120 to 350° C., preferably at 150 to 300° C., more preferably at 180 to 270° C., still more preferably at 180 to 220° C. to obtain an intermediate product. Then, the intermediate product and a carbonate ester are polymerized using the above-described catalyst. In this case, the temperature may be from 120 to 350° C., preferably from 150 to 300° C., more preferably from 200 to 270° C., still more preferably from 220 to 260° C. In addition, during these reactions, the produced water or hydroxy compound such as alcohol can be distilled off to the outside of the system by changing the degree of pressure reduction in a stepwise manner preferably to finally reach 0.13 kPa or less. The reaction time may be approximately from 1 to 10 hours.

The catalyst is not particularly limited in its form at the time of addition and may be added to the monomer in the form of a powder, etc. or may be added to the monomer in the form of a dispersion or solution in a solvent. In addition, aluminum or a compound thereof, and a phosphorus compound may be mixed in advance and added, or aluminum or a compound thereof, and a phosphorus compound may be separately added, but from the viewpoint of maintaining the activity of the aluminum catalyst, these are preferably mixed in advance. The timing of addition of the catalyst is preferably before starting the reaction with a carbonate ester of the poly(ester)carbonate.

The timing of addition of the catalyst is not particularly limited, and the catalyst may be added from the beginning or added after, for example, a $H_2O$ elimination reaction is substantially terminated. In particular, when the latter timing of addition is employed, this is advantageous in that, for example, $H_2O$ can be recovered at first and after the addition of the catalyst, components other than $H_2O$, such as phenol, can be efficiently recovered.

In producing a poly(ester)carbonate, an end-capping agent, an antioxidant, etc. may be used, if desired.

<Monomer—Diol>

The diol used in the production method of the present invention can be a diol usually used in the production of a poly(ester)carbonate.

The diol includes, for example, ethylene glycol, propylene glycol, diethylene glycol, triethylene glycol, butylene glycol, pentanediol, hexanediol, heptanediol, octanediol, nonanediol, neopentyl glycol, hexanediol, cyclohexanediol, tricyclo[$5.2.1.0^{2,6}$]decanedimethanol, cyclohexane-1,4-dimethanol, decalin-2,6-dimethanol, norbornanedimethanol, pentacyclopentadecanedimethanol, cyclopentane-1,3-dimethanol, spiro glycol, isosorbide, isomannide, isoidide, decamethylene glycol, dodecanediol, polyethylene glycol, polymethylene glycol, polytetramethylene glycol, 4,4'-dihydroxy bisphenol, 1,4-bis(p-hydroxyethoxy)benzene, 1,4-bis(P-hydroxyethoxyphenyl)sulfone, bis(p-hydroxyphenyl)ether, bis(p-hydroxyphenyl)sulfone, bis(p-hydroxyphenyl)methane, 1,2-bis(p-hydroxyphenyl)ethane, 2,2-bis(4-hydroxyphenyl)propane, 2,2-bis(3-methyl-4-hydroxyphenyl)propane, 1,1-bis(4-hydroxyphenyl)-1-phenylethane, 1,3-bis(2-(4-hydroxyphenyl)-2-propyl)benzene, 1,1-bis(4-hydroxyphenyl)-3,3,5-trimethylcyclohexane, 1,1-bis(4-hydroxyphenyl)cyclohexane, bis(4-hydroxyphenyl)diphenylmethane, 1,1-bis(4-hydroxyphenyl)decane, bis(4-hydroxyphenyl)sulfide, bis(4-hydroxy-3-methylphenyl)sulfide, biphenol, 9,9-bis(4-hydroxyphenyl)fluorene, 9,9-bis(4-hydroxy-3-methylphenyl)fluorene, 9,9-bis(4-hydroxy-3-cyclohexylphenyl)fluorene, 9,9-bis(4-hydroxy-3-phenylphenyl)fluorene, bis(4-hydroxyphenyl)sulfone, 10,10-bis(4-hydroxyphenyl)anthrone, benzenediol, naphthalenediol, 9,9-bis(4-(2-hydroxyethoxy)phenyl)fluorene, 9,9-bis(4-(2-hydroxyethoxy)-3-phenylphenyl)fluorene, 9,9-bis(4-(2-hydroxyethoxy)phenyl)-2,7-diphenylfluorene, 1,1'-bi-2-naphthol, 2,2'-bis(2-hydroxyethoxy)-1,1'-binaphthyl, 9,9-bis[4-(2-hydroxyethoxy)phenyl]-2,3-benzofluorene, 9,9-bis[6-(2-hydroxyethoxy)-2-naphthyl]fluorene, etc., and one of these may be used alone or two or more thereof may be used in combination.

As the diol, for example, a compound represented by the following formula (A) or (B) is also preferably used:

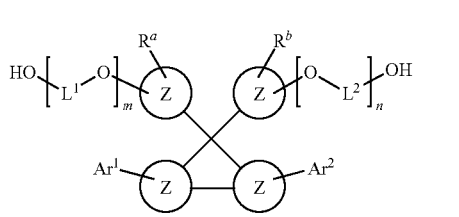

(A)

In the formula, the rings Z (the same or different) represent an aromatic group or a fused polycyclic aromatic group, each of $R^a$ and $R^b$ independently represents a hydrogen atom, a halogen atom or a hydrocarbon group having a carbon number of 1 to 12 or a carbon number of 1 to 20, which may contain an aromatic group, each of $Ar^1$ and $Ar^2$ represents a hydrogen atom or an aromatic group having a carbon number of 6 to 10, which may contain a substituent, each of $L^1$ an $L^2$ independently represents a divalent linking group, and each of m and n independently represents 0 or 1.

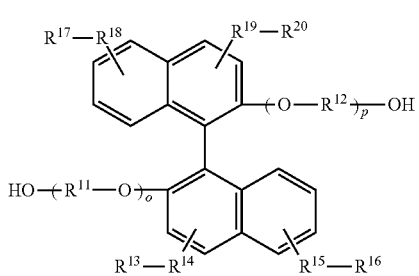

(B)

In the formula, each of $R^{11}$ and $R^{12}$ independently represents a hydrocarbon group having a carbon number of 1 to 10, which may contain an aromatic group, each of o and p independently represents an integer of 0 or more, and each of $R^{13}$ to $R^{20}$ independently represents a hydrogen atom, a fluorine atom, a chlorine atom, a bromine atom, an iodine atom, or a hydrocarbon group having a carbon number of 1 to 20, which may contain an aromatic group. Preferably, each of $R^{13}$ to $R^{20}$ independently represents a hydrogen atom or a hydrocarbon group having a carbon number of 1 to 12, which may contain an aromatic group, and more preferably, each of $R^{13}$ to $R^{20}$ represents a hydrogen atom.

2,2'-Bis(2-hydroxyethoxy)-1,1'-binaphthyl (hereinafter, sometimes simply referred to as BHEB), i.e., a compound where R and $R^{12}$ are an ethylene group, o and p are 1, and $R^{13}$ to $R^{20}$ are a hydrogen atom, or 1,1'-bi-2-naphthol, i.e., a compound where o and p are 0 and $R^{13}$ to $R^{20}$ are a hydrogen atom, is still more preferred.

As preferable examples of the compound represented by formula (A), 9,9-bis[4-(2-hydroxyethoxy)phenyl]fluorene (hereinafter, sometimes simply referred to as BPEF), i.e., a compound where $L^1$ and $L^2$ are an ethylene group, m and n are 1, $R^a$, $R^b$, $Ar^1$ and $Ar^2$ are a hydrogen atom and Z is a benzene ring, 9,9-bis[4-(2-hydroxyethoxy)-3-phenylphenyl]fluorene (hereinafter, sometimes simply referred to as OPBPEF), i.e., a compound where $R^a$ and $R^b$ are a phenyl group, or biscresolfluorene, i.e., a compound where o and p are 0 and $R^a$ and $R^b$ are a methyl group, is yet still more preferred.

In addition, as preferable examples of the compound represented by formula (A), a compound represented by the following formula (d) is also preferably used:

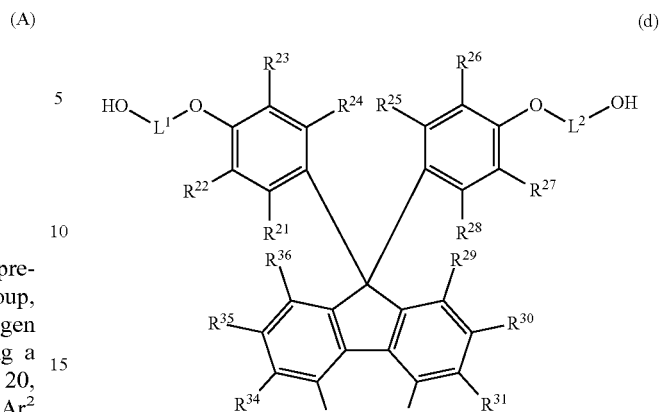

(d)

In formula (d), each of $R^{21}$ to $R^{36}$ independently represents a hydrogen atom, a fluorine atom, a chlorine atom, a bromine atom, an iodine atom, or a hydrocarbon group having a carbon number of 1 to 12, which may contain an aromatic group, one pair out of pairs $R^{29}$ and $R^{30}$, $R^{30}$ and $R^{31}$, $R^{31}$ and $R^{32}$, $R^{33}$ and $R^{34}$, $R^{34}$ and $R^{35}$, and $R^{35}$ and $R^{36}$ combine with each other to form a ring, and each of $L^1$ and $L^2$ independently represents a divalent linking group.

Specifically, as the diol represented by formula (d), 9,9-bis(4-(2-hydroxyethoxy)phenyl)-1,2-benzofluorene, 9,9-bis(4-(2-hydroxyethoxy)-3-methylphenyl)-1,2-benzofluorene, 9,9-bis(4-(2-hydroxyethoxy)-3-phenylphenyl)-1,2-benzofluorene, 9,9-bis(4-(2-hydroxyethoxy)phenyl)-2,3-benzofluorene, 9,9-his (4-(2-hydroxyethoxy)-3-methylphenyl)-2,3-benzofluorene, 9,9-bis(4-(2-hydroxyethoxy)-3-phenylphenyl)-2,3-benzofluorene, 9,9-bis(4-(2-hydroxyethoxy)phenyl)-3,4-benzofluorene, 9,9-bis(4-(2-hydroxyethoxy)-3-methylphenyl)-3,4-benzofluorene, and 9,9-bis(4-(2-hydroxyethoxy)-3-phenylphenyl)-3,4-benzofluorene, etc. are preferred, 9,9-bis(4-hydroxyphenyl)-1,2-benzofluorene, 9,9-bis(4-(2-hydroxyethoxy)phenyl)-2,3-benzofluorene, and 9,9-bis(4-hydroxyphenyl)-3,4-benzofluorene are more preferred, and 9,9-bis(4-(2-hydroxyethoxy)phenyl)-2,3-benzofluorene is still more preferred. One of these may be used alone, or two or more thereof may be used in combination.

As preferable examples of the compound represented by formula (A), for example, a compound represented by formula (e) is also preferably used:

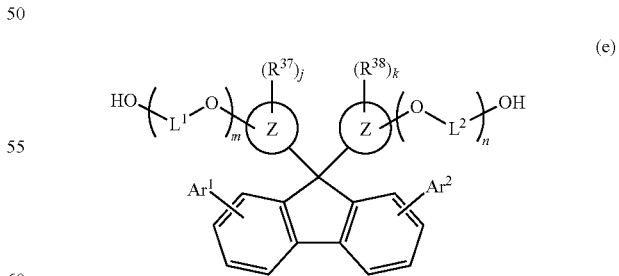

(e)

In formula (e), the rings Z (the same or different) represent an aromatic group, each of $R^{37}$ and $R^{38}$ independently represents a hydrogen atom, a halogen atom, or a hydrocarbon group having a carbon number of 1 to 12, which may contain an aromatic group, each of $Ar^1$ and $Ar^2$ represents a hydrogen atom or an aromatic group having a carbon number of 6 to 10, which may contain a substituent, each of $L^1$ and $L^2$ independently represents a divalent linking group, each of j and k independently represents an integer of 0 or more, and each of m and n independently represents 0 or 1.

Furthermore, a diol where in formula (e), the ring Z is a naphthalene ring and $Ar^1$ and $Ar^2$ are selected from the same chemical groups as those of $R^{37}$ and $R^{38}$, is also favorably used.

Specifically, the fluorene-based diol represented by formula (e) includes the followings:

9,9-bis(4-(2-hydroxyethoxy)phenyl)-1,8-diphenylfluorene, 9,9-bis(4-(2-hydroxyethoxy)-3-methylphenyl)-1,8-diphenylfluorene, 9,9-bis(4-(2-hydroxyethoxy)-3-phenylphenyl)-1,8-diphenylfluorene, 9,9-bis(4-(2-hydroxyethoxy)-1-naphthyl)-1,8-diphenylfluorene, 9,9-bis(6-(2-hydroxyethoxy)-2-naphthyl)-1,8-diphenylfluorene, 9,9-bis(4-hydroxyphenyl)-1,8-diphenylfluorene, 9,9-bis(4-hydroxy-3-methylphenyl)-1,8-diphenylfluorene, 9,9-bis(4-hydroxy-3-phenylphenyl)-1,8-diphenylfluorene, 9,9-bis(4-hydroxy-1-naphthyl)-1,8-diphenylfluorene, 9,9-bis(6-hydroxy-2-naphthyl)-1,8-diphenylfluorene, 9,9-bis(4-(2-hydroxyethoxy)phenyl)-2,7-diphenylfluorene, 9,9-bis(4-(2-hydroxyethoxy)-3-methylphenyl)-2,7-diphenylfluorene, 9,9-bis(4-(2-hydroxyethoxy)-3-phenylphenyl)-2,7-diphenylfluorene, 9,9-bis(4-(2-hydroxyethoxy)-1-naphthyl)-2,7-diphenylfluorene, 9,9-bis(6-(2-hydroxyethoxy)-2-naphthyl)-2,7-diphenylfluorene, 9,9-bis(4-hydroxyphenyl)-2,7-diphenylfluorene, 9,9-bis(4-hydroxy-3-methylphenyl)-2,7-diphenylfluorene, 9,9-bis(4-hydroxy-3-phenylphenyl)-2,7-diphenylfluorene, 9,9-bis(4-hydroxy-1-naphthyl)-2,7-diphenylfluorene, 9,9-bis(6-hydroxy-2-naphthyl)-2,7-diphenylfluorene, 9,9-bis(4-(2-hydroxyethoxy)phenyl)-3,6-diphenylfluorene, 9,9-bis(4-(2-hydroxyethoxy)-3-methylphenyl)-3,6-diphenylfluorene, 9,9-bis(4-(2-hydroxyethoxy)-3-phenylphenyl)-3,6-diphenylfluorene, 9,9-bis(4-(2-hydroxyethoxy)-1-naphthyl)-3,6-diphenylfluorene, 9,9-bis(6-(2-hydroxyethoxy)-2-naphthyl)-3,6-diphenylfluorene, 9,9-bis(4-hydroxyphenyl)-3,6-diphenylfluorene, 9,9-bis(4-hydroxy-3-methylphenyl)-3,6-diphenylfluorene, 9,9-bis(4-hydroxy-3-phenylphenyl)-3,6-diphenylfluorene, 9,9-bis(4-hydroxy-1-naphthyl)-3,6-diphenylfluorene, 9,9-bis(6-hydroxy-2-naphthyl)-3,6-diphenylfluorene, 9,9-bis(4-(2-hydroxyethoxy)phenyl)-4,5-diphenylfluorene, 9,9-bis(4-(2-hydroxyethoxy)-3-methylphenyl)-4,5-diphenylfluorene, 9,9-bis(4-(2-hydroxyethoxy)-3-phenylphenyl)-4,5-diphenylfluorene, 9,9-bis(4-(2-hydroxyethoxy)-1-naphthyl)-4,5-diphenylfluorene, 9,9-bis(6-(2-hydroxyethoxy)-2-naphthyl)-4,5-diphenylfluorene, 9,9-bis(4-hydroxyphenyl)-4,5-diphenylfluorene, 9,9-bis(4-hydroxy-3-methylphenyl)-4,5-diphenylfluorene, 9,9-bis(4-hydroxy-3-phenylphenyl)-4,5-diphenylfluorene, 9,9-bis(4-hydroxy-1-naphthyl)-4,5-diphenylfluorene, 9,9-bis(6-hydroxy-2-naphthyl)-4,5-diphenylfluorene, 9,9-bis(4-(2-hydroxyethoxy)-1-naphthyl)fluorene, 9,9-his (6-(2-hydroxyethoxy)-2-naphthyl)fluorene, etc. are preferred.

Such a diol can be used not only for the polymerization with a carbonate ester but also for obtaining an intermediate product to produce a polyester carbonate.

<Monomer—Carbonate Ester>

The carbonate ester used in the production method of the present invention can be a polycarbonate ester usually used in the production of a poly(ester)carbonate.

The carbonate ester includes an ester of, for example, an aryl or aralkyl group having a carbon number of 6 to 10, which may be substituted, or an alkyl group having a carbon number of 1 to 4. Specifically, the carbonate ester includes diphenyl carbonate, ditolyl carbonate, bis(chlorophenyl)carbonate, m-cresol carbonate, dinaphthyl carbonate, bis(diphenyl)carbonate, dimethyl carbonate, diethyl carbonate, dibutyl carbonate, etc., and among others, diphenyl carbonate is preferred.

<Monomer—Dicarboxylic Acid or Ester-Forming Derivative Thereof>

In the case where the production method of a poly(ester) carbonate of the present invention is a production method of a polyester carbonate, a dicarboxylic acid or an ester-forming derivative thereof used in the step of obtaining an intermediate product can be a dicarboxylic acid or an ester-forming derivative thereof, which is known for producing an intermediate product usually used in this field.

The dicarboxylic acid includes, for example, an aliphatic dicarboxylic acid such as malonic acid, succinic acid, glutaric acid, adipic acid, pimelic acid, suberic acid, azelaic acid, methylmalonic acid and ethylmalonic acid, a monocyclic aromatic dicarboxylic acid such as phthalic acid, isophthalic acid and terephthalic acid, a polycyclic aromatic dicarboxylic acid such as 2,6-naphthalenedicarboxylic acid, 2,7-naphthalenedicarboxylic acid, 2,3-naphthalenedicarboxylic acid, 1,4-naphthalenedicarboxylic acid, 1,8-naphthalenedicarboxylic acid, anthracenedicarboxylic acid, phenanthrenedicarboxylic acid and 2,2'-(carboxymethoxy)-1,1'-binaphthyl, 9,9-bis(carboxymethyl) fluorene, 9,9-bis(2-carboxyethyl) fluorene, 9,9-bis((1-carboxyethyl)fluorene, 9,9-bis(1-carboxypropyl)fluorene, 9,9-bis(2-carboxypropyl)fluorene, 9,9-bis(2-carboxy-1-methylethyl) fluorene, 9,9-bis(2-carboxy-1-methylpropyl) fluorene, 9,9-bis(2-carboxybutyl) fluorene, 9,9-bis(2-carboxy-1-methylbutyl) fluorene, 9,9-bis(5-carboxypentyl) fluorene and 9,9-bis(carboxycyclohexyl)fluorene, a biphenyldicarboxylic acid such as 2,2'-biphenyldicarboxylic acid, and an alicyclic dicarboxylic acid such as 1,4-cyclohexanedicarboxylic acid and 2,6-decalindicarboxylic acid, with isophthalic acid, terephthalic acid, 2,6-naphthalenedicarboxylic acid and 2,2'-bis(carboxymethoxy)-1,1'-binaphthyl being preferred. One of these may be used alone, or two or more kinds thereof may be used in combination. Furthermore, as the ester-forming derivative, acid chlorides or esters, such as methyl ester, ethyl ester, and phenyl ester, of the carboxylic acids above may be used.

As the dicarboxylic acid, for example, a compound represented by formula (C) is also preferably used:

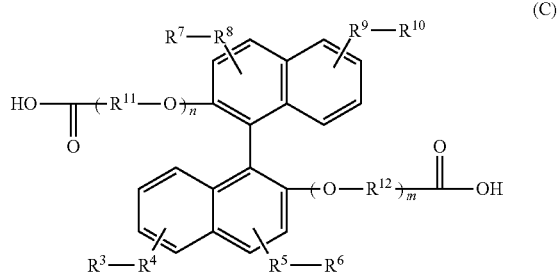
(C)

In the formula, each of $R^1$ and $R^2$ independently represents a hydrocarbon group having a carbon number of 1 to 10, which may contain an aromatic group, each of n and m independently represents an integer of 0 or more, and each of $R^3$ to $R^{10}$ independently represents a hydrogen atom, a fluorine atom, a chlorine atom, a bromine atom, an iodine atom or a hydrocarbon group having a carbon number of 1 to 20, which may contain an aromatic group.

Specific representative examples of the dicarboxylic acid represented by formula (C) or an ester-forming derivative thereof include, but are not limited to, the followings: 2,2'-dicarboxy-1,1'-binaphthyl, 2,2'-bis(carboxymethoxy)-1,1'-binaphthyl, 2,2'-bis(2-carboxyethoxy)-1,1'-binaphthyl, 2,2'-bis(3-carboxypropoxy)-1,1'-binaphthyl, 2,2'-dimethoxycarbonyl-1,1'-binaphthyl, 2,2'-bis(methoxycarbonylmethoxy)-1,1'-binaphthyl, 2,2'-bis(2-methoxycarbonylethoxy)-1,1'-binaphthyl, 2,2'-bis(3-methoxycarbonylpropoxy)-1,1'-binaphthyl, 2,2'-diethoxycarbonyl-1,1'-binaphthyl, 2,2'-bis(ethoxycarbonylmethoxy)-1,1'-binaphthyl, 2,2'-bis(2-ethoxycarbonylethoxy)-1,1'-binaphthyl, 2,2'-bis(3-ethoxycarbonylpropoxy)-1,1'-binaphthyl, 2,2'-diphenoxycarbonyl-1,1'-binaphthyl, 2,2'-bis(phenoxycarbonylmethoxy)-1,1'-binaphthyl, 2,2'-bis(2-phenoxycarbonylethoxy)-1,1'-binaphthyl, 2,2'-bis(3-phenoxycarbonylpropoxy)-1,1'-binaphthyl, 2,2'-di-tert-butoxycarbonyl-1,1'-binaphthyl, 2,2'-bis(tert-butoxycarbonylmethoxy)-1,1'-binaphthyl, 2,2'-bis(2-tert-butoxycarbonylethoxy)-1,1'-binaphthyl, 2,2'-bis(3-tert-butoxycarbonylpropoxy)-1,1'-binaphthyl, etc. Among these, 2,2'-bis(carboxymethoxy)-1,1'-binaphthyl (hereinafter, sometimes simply referred to as BCMB), i.e., a compound where in formula (C), $R^1$ and $R^2$ are a methylene group, o and p are 1, and $R^3$ to $R^{10}$ are a hydrogen atom, or an ester-forming derivative thereof, is most preferred.

<Polymer Produced>

The poly(ester)carbonate obtained by the production method of the present invention is not particularly limited. For example, the poly(ester)carbonate obtained by the production method of the present invention is the following poly(ester)carbonate.

<<Poly(ester)carbonate>>

The poly(ester)carbonate of a first embodiment of the present invention contains 50 mol % or more of a stereostructural component unit based on all units, wherein the stereostructural component unit contains 4 or more aromatic groups selected from the group consisting of a monocyclic aromatic group and a fused polycyclic aromatic group or contains 2 or more fused polycyclic aromatic groups, the specific viscosity measured for a solution prepared by dissolving the polymer at 0.52 mass % in methylene chloride is from 0.12 to 0.40, and the b* value of CIE1976 (L*a*b*) color system measured for a solution prepared by dissolving the polymer at 13 mass % in methylene chloride is 4.0 or less. In other words, the poly(ester)carbonate of the present invention has a sufficiently high molecular weight while having a bulky component unit and at the same times, takes on a very low yellow tinge.

From the viewpoint of obtaining an optically excellent poly(ester)carbonate, the polymer of the present invention may contain 50 mol % or more, 60 mol % or more, 70 mol % or more, 80 mol % or more, 90 mol % or more, or 95 mol % or more of a stereostructural component unit based on the total number of moles of all monomer units. Here, the stereostructural component unit contains 4 or more aromatic groups selected from the group consisting of a monocyclic aromatic group and a fused polycyclic aromatic group or contains 2 or more fused polycyclic aromatic groups. In this case, the fused polycyclic aromatic group includes a fused bicyclic aromatic group, a fused tricyclic aromatic group, a fused tetracyclic aromatic group, etc.

Incidentally, the "based on all units" as used in the present invention means to be based on the number of moles of all monomer units and in the case of poly(ester)carbonate, means to be based on the number of moles of a minimum unit between carbonate bonds and/or ester bonds. Note that this minimum unit is sometimes referred to as all monomer units, as a repeating unit, or simply as a unit. In addition, a carbonate ester is not encompassed by the all monomer units.

The stereostructural component unit is preferably a fluorene-based component unit and/or a binaphthyl-based component unit from the viewpoint of obtaining a poly(ester) carbonate having high refractive index and low birefringence. Particularly preferable stereostructural component units include units derived from the monomers of formulae (A) to (C) (hereinafter referred to as "unit represented by formula (A)", etc.).

In this case, the stereostructural component unit is preferably a fluorene-based component unit and/or a binaphthyl-based component unit from the viewpoint of obtaining a poly(ester)carbonate having high refractive index and low birefringence. Here, the fluorene-based component unit encompasses a structure in which at least part of the aromatic group of fluorene is substituted by a fused polycyclic aromatic group, and a structure in which a substituent is substituted on at least part of the aromatic group of fluorene. In addition, the binaphthyl-based component unit encompasses a structure in which at least part of the naphthalene group of binaphthyl is substituted by a fused polycyclic aromatic group, and a structure in which a substituent is substituted on at least part of the naphthalene group of binaphthyl.

In order to obtain a poly(ester)carbonate having such a stereostructural component unit with a high molecular weight, an alkali catalyst such as sodium hydrogencarbonate or a titanium-based catalyst has been heretofore mainly used. In this connection, the monomer for such a polymer is very bulky and prevents easy progress of polymerization and in the case of containing a dicarboxylic acid in the raw materials, since use of an alkali catalyst is difficult, only a titanium-based catalyst having a high catalytic action has been substantially used.

However, the present inventors have found that when a catalyst comprising aluminum or a compound thereof, and a phosphorus compound is used, the above-described poly(ester)carbonate can also be made to have a high molecular weight. Furthermore, surprisingly, it has been found that when this catalyst is used, a poly(ester)carbonate having higher transparency than the polymer obtained using a titanium-based catalyst is obtained. This is considered to be attributable to the fact that the titanium-based catalyst catalytically acts also on the thermal decomposition reaction and the obtained polymer is slightly yellowed due to thermal decomposition.

In contrast, the above-described catalyst comprising aluminum or a compound thereof, and a phosphorus compound is thought to have no catalytic action to the thermal decomposition reaction of the polymer while having activity capable of sufficiently synthesizing a polymer containing a bulky repeating unit, and thus, the poly(ester)carbonate of the present invention is very advantageous.

In the present description, the "stereostructural" indicates a monomer or component unit in which aromatic groups are present in directions not parallel to each other. The poly(ester)carbonate having a stereostructural component unit can have a high refractive index and a low refractive index. The fluorene-based component unit has a stereoconfiguration called a cardo structure, and this is a configuration where a plane on which two monocyclic aromatic groups or fused polycyclic aromatic groups are present intersects with a plane on which other two monocyclic aromatic groups or fused polycyclic aromatic group are present. The binaphthyl-based component unit has such a stereoconfiguration that two fused bicyclic aromatic groups are at right angles to each other.

The poly(ester)carbonate of a second embodiment of the present invention contains 50 mol % or more of a stereostructural component unit, wherein the stereostructural component unit contains 4 or more aromatic groups selected from the group consisting of a monocyclic aromatic group and a fused polycyclic aromatic group or contains 2 or more fused polycyclic aromatic groups and the poly(ester) carbonate contains aluminum and phosphorus and is substantially free of, as the catalyst, titanium, germanium, antimony and tin. Incidentally, in the present description, the "poly (ester)carbonate of the present invention" encompasses the poly(ester)carbonates of the first and second embodiments above.

The stereostructural component unit means the diol component or dicarboxylic acid component described in Production Method of Poly(ester)carbonate above. Accordingly, the stereostructural component unit may be a fluorene-based component unit and/or a binaphthyl-based component unit.

In the case where the poly(ester)carbonate of the present invention is a polyester carbonate, the molar ratio between the carbonate unit and the ester unit is preferably from 99:1 to 1:99, more preferably from 75:25 to 3:97, and may be from 50:50 to 5:95, from 40:60 to 7:93, or from 30:70 to 10:90.

<Impurity>

The poly(ester)carbonate of the present invention contains a catalyst-derived aluminum, and the aluminum content may be, in terms of a value as measured using ICP-OES-5100 manufactured by Agilent Technologies japan, Ltd., 1 ppm or more, 5 ppm or more, 10 ppm or more, 15 ppm or more, or 20 ppm or more, and may be 100 ppm or less, 80 ppm or less, 60 ppm or less, or 40 ppm or less. Here, the aluminum content above is the content of catalyst-derived aluminum, and it would be easily understood that in the case where aluminum is carried over from a filler, etc., the content must be counted excluding it.

The poly(ester)carbonate of the present invention contains a catalyst-derived phosphorus, and the phosphorus content may be, in terms of a value as measured using ICP-OES-5100 manufactured by Agilent Technologies Japan, Ltd., 1 ppm or more, 10 ppm or more, 20 ppm or more, 30 ppm or more, or 40 ppm or more, and may be 200 ppm or less, 100 ppm or less, 80 ppm or less, or 60 ppm or less. Here, the phosphorus content above is the content of catalyst-derived phosphorus, and it would be easily understood that in the case where phosphorus is carried over from a filler, etc., the content must be counted excluding it.

The poly(ester)carbonate does not contain catalyst-derived titanium, germanium, antimony and tin, and the content of each of these may be, in terms of a value as measured using ICP-OES-5100 manufactured by Agilent Technologies Japan, Ltd., 5 ppm or less, 4 ppm or less, 3 ppm or less, 2 ppm or less, or 1 ppm or less. Here, the content above of each of titanium, germanium, antimony and tin is the content of the catalyst-derived impurity, and it would be easily understood that in the case where the impurity is carried over from a filler, etc., the content must be counted excluding it.

<Physical Properties>

The poly(ester)carbonate of the present invention can be produced without using a catalyst promoting the thermal decomposition reaction of the polymer, as a result, its transparency is very high. Specifically, in the poly(ester) carbonate of the present invention, the b* value of CIE1976 (L*a*b*) color system can be 4.0 or less, 3.0 or less, 2.5 or less, 2.0 or less, or 1.5 or less. In this case, the b* value is the value of CIE1976 (L*a*b*) color system measured using a spectrophotometer for a solution prepared by dissolving 1.0 g of the polymer in 5 ml of methylene chloride (a solution prepared by dissolving the polymer at 13 mass % in methylene chloride).

The specific viscosity of the poly(ester)carbonate of the present invention is preferably from 0.12 to 0.40, more preferably from 0.15 to 0.35, still more preferably from 0.18 to 0.30. When the specific viscosity is in the range above, the balance of moldability and mechanical strength is advantageously excellent. Here, as for the specific viscosity, a specific viscosity ($\eta_{sp}$) at 20° C. was measured using a solution prepared by dissolving 0.7 g of the resin in 100 ml of methylene chloride (a solution prepared by dissolving the polymer at 0.52 mass % in methylene chloride). In the measurement, the falling time between marked lines of Ostwald viscosity tube in a constant temperature bath at 20±0.01° C. is measured, and the specific viscosity ($\eta_{sp}$) at 20° C. of the solution is determined according to the following formula.

$$\eta_{sp}=(t_1-t_0)/t_0$$

$t_1$: the falling time between marked lines of the polymer solution $t_0$: the falling time between marked lines of methylene chloride The refractive index (hereinafter, sometimes simply referred to as nD) at 25° C. with a measurement wavelength of 589 nm of the poly(ester)carbonate of the present invention can be 1.635 or more and, for example, is preferably from 1.650 to 1.700, more preferably from 1.655 to 1.697, still more preferably from 1.657 to 1.695.

The glass transition temperature (hereinafter, sometimes simply referred to as Tg) of the poly(ester)carbonate of the present invention is preferably from 128 to 160° C., more preferably from 130 to 158° C.

The relation between the refractive index nD and Tg of the poly(ester)carbonate of the present invention preferably satisfies the relational expression:

$$Tg > -850nD+1555 \quad (1)$$

The poly(ester)carbonate of the present invention can have particularly the refractive index and heat resistance at a high level in good balance. It is more preferred that nD is from 1.665 to 1.700 and Tg is from 130 to 160° C., and it is most preferred that nD is from 1.668 to 1.695 and Tg is from 138 to 150° C.

The Abbe number (v) of the poly(ester)carbonate of the present invention is preferably from 17 to 25, more preferably 17 to 23. The Abbe number is calculated using the following formula from refractive indexes at wavelengths of 486 nm, 589 nm, and 656 nm as measured at 25° C.

$$v=(nD-1)/(nF-nC)$$

In the present description, the symbols mean the followings:
nD: the refractive index at a wavelength of 589 nm,
nC: the refractive index at a wavelength of 656 nm, and
nF: the refractive index at a wavelength of 486 nm.

In the poly(ester)carbonate of the present invention, the absolute value of the orientation birefringence (Δn) calculated according to the following formula is preferably from 0 to $8\times10^{-3}$, more preferably from 0 to $4\times10^{-3}$, still more preferably from 0 to $2\times10^{-3}$. The orientation birefringence (Δn) is measured at a wavelength of 589 nm when a 100 μm-thick cast film obtained from the poly(ester)carbonate of the present invention is 2-fold stretched at Tg+10° C., and the orientation birefringence is preferably in the range above, because the optical distortion of a lens using the polymer is reduced.

$\Delta n = Re/d$

Δn: orientation birefringence
Re: retardation (nm)
d: thickness (nm)

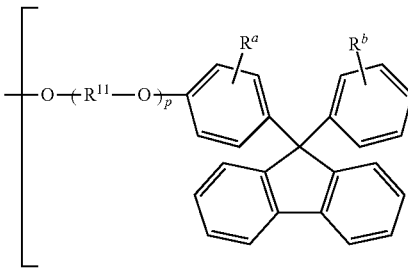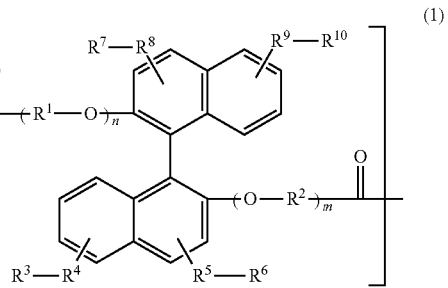

(1)

In the poly(ester)carbonate of the present invention, the total light transmittance at a thickness of 1 mm is preferably 80% or more, more preferably 85% or more, still more preferably 88% or more. When the total light transmittance is in the range above, the polymer is suitable as an optical member. Incidentally, in the measurement of the total light transmittance, a 1 mm-thick molded piece was measured using NDH-300A manufactured by Nippon Denshoku Industries Co., Ltd.

In the poly(ester)carbonate of the present invention, the water absorption rate after immersion at 23° C. for 24 hours is preferably 0.25 mass % or less, more preferably 0.20 mass % or less. When the water absorption rate is in the range above, the optical properties advantageously change little due to water absorption.

<Polymer Skeleton>

For example, as the polymer skeleton of the polyester carbonate having a stereostructural component unit, the polymer can have polymer skeletons of the following first to third polyester carbonates and the fourth to sixth poly(ester) carbonates.

<First Polyester Carbonate>

The polyester carbonate of a first preferred embodiment contains 70 mol % or more of units represented by formula (A) and formula (C) based on all units. Preferably, the units represented by formula (A) and formula (C) account for 70 mol % or more, preferably 75 mol % or more, more preferably 80 mol % or more based on all units. Within this range, excellent heat resistance is obtained. The monomer units except for the units represented by formula (A) and formula (C) may be the above-described diol, carboxylic acid or an ester-forming derivative thereof, and a repeating unit derived from other copolymerization components.

Accordingly, the first polyester carbonate can contain a fluorene-based component unit and a binaphthyl-based component unit represented by the following formula (1):

<Second Polyester Carbonate>

The polyester carbonate of a second preferred embodiment contains 70 mol % or more of units represented by formula (B) and formula (C) based on all units. Preferably, the units represented by formula (B) and formula (C) account for 70 mol % or more, preferably 75 mol % or more, more preferably 80 mol % or more based on all units. Within this range, excellent heat resistance is obtained. The repeating units except for the units represented by formula (B) and formula (C) may be the above-described diol, carboxylic acid or an ester-forming derivative thereof, and a repeating unit derived from other copolymerization components.

The second polyester carbonate can contain a binaphthyl-based component unit represented by the following formula (2):

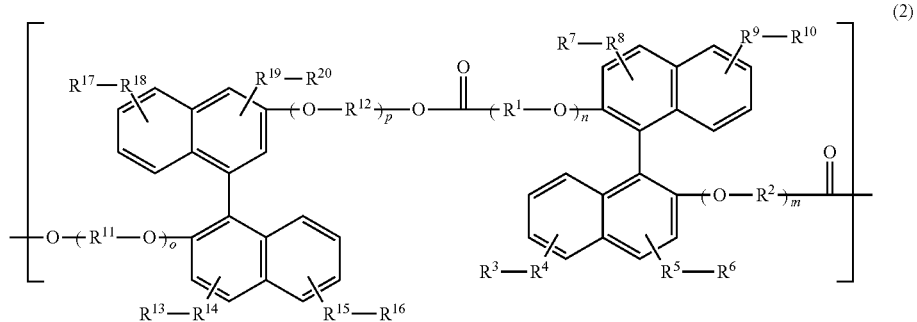

(2)

<Third Polyester Carbonate>

The polyester carbonate of a third preferred embodiment can contain 70 mol % or more of the total of a unit (X) composed of formula (A) and formula (C) and a unit (Y) composed of formula (B) and formula (C) based on all units.

In addition, the third polyester carbonate contains 70 mol % or more of the total of a fluorene-based component unit and/or a binaphthyl-based component repeating unit represented by formula (1) and formula (2) based on all units.

In the polyester carbonate of the third preferred embodiment, the ratio of a unit (Y) is from 20 to 80:from 80 to 20, preferably from 25 to 75:from 75 to 25, more preferably from 30 to 70:from 70 to 30. Within this range, the polymer can have high refractive index, low birefringence and high heat resistance and, among others, can have the refractive index and heat resistance at a high level in good balance.

The units except for the units represented by formula (A), formula (B) and formula (C) may be the above-described diol, carboxylic acid or an ester-forming derivative thereof, and a repeating unit derived from other copolymerization components.

With respect to polyester carbonates of the first to third preferred embodiments, the 1,1'-binaphthyl skeletons of formulae (B) and (C) have effects of enhancing the heat resistance and refractive index of the polyester carbonate and at the same time, reducing the birefringence owing to such a stereoconformation that crossing at right angles occurs in the bond axis connecting two naphthalene rings.

The 1,1'-binaphthyl skeleton may be substituted by a substituent, and substituents may be ring-fused to each other. The substituent includes various groups and is not particularly limited but typically includes an alkyl, an aryl, etc. The alkyl group is preferably an alkyl group having a carbon number of 1 to 12 and may be linear or branched. The aryl group includes a phenyl group, a naphthyl group, a biphenyl group, etc.

In addition, the binaphthyl skeleton may be any of R form, S form and racemic form and is preferably a racemic form. The racemic form that need not be optically resolved is advantageous in terms of cost.

<Fourth (Polyester)carbonate>

A fourth poly(ester)carbonate contains a repeating unit represented by the following formula (4):

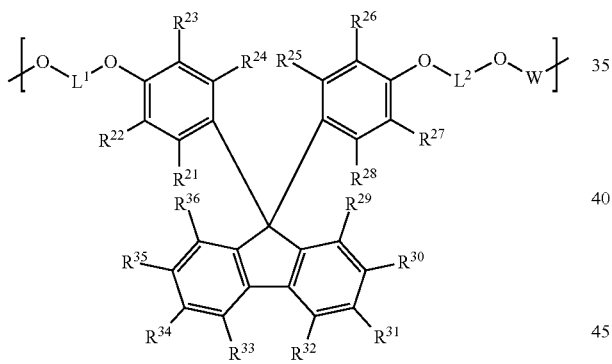

(4)

In the formula, each of $R^{21}$ to $R^{36}$ independently represents a hydrogen atom, a fluorine atom, a chlorine atom, a bromine atom, an iodine atom, or a hydrocarbon group having a carbon number of 1 to 12, which may contain an aromatic group, one pair out of pairs $R^{29}$ and $R^{30}$, $R^{30}$ and $R^{31}$, $R^{31}$ and $R^{32}$, $R^{33}$ and $R^{34}$, $R^{34}$ and $R^{35}$, and $R^{35}$ and $R^{36}$ combine with each other to form a ring, each of $L^1$ and $L^2$ independently represents a divalent linking group, W is at least one selected from the group consisting of a carbonyl group (—C(=O)—) and a dicarbonyl group (—C(=O)—X—C(=O)—) linked by a divalent linking group X, and X is a divalent linking group.

Here, $L^1$ and $L^2$ are preferably an alkylene group having a carbon number of 1 to 10, which may contain an ether group, and is more preferably an ethylene group. In addition, X is preferably at least one selected from the group consisting of a phenylene group, a naphthalenediyl group, and a group represented by the following formula:

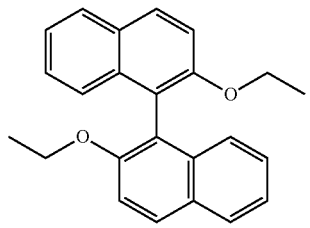 [SMILES: CCOc1ccc2ccccc2c1-c1c(OCC)ccc2ccccc12]

The fourth poly(ester)carbonate may be a polymer using, for example, a dicarboxylic acid or an ester-forming derivative thereof described regarding the first polyester carbonate and containing, for example, 70 mol % or more of a repeating unit of the following formula (4-1) based on all units:

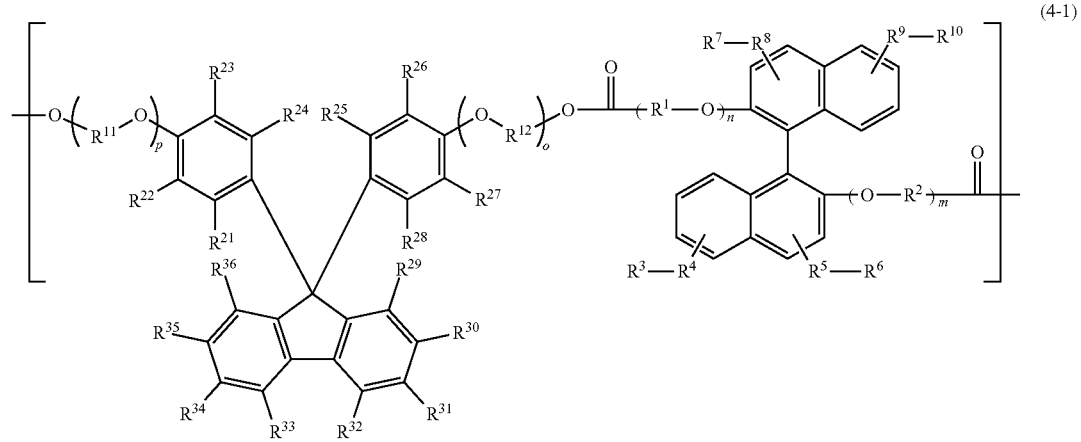

(4-1)

In formula (4-1), $R^1$ to $R^{12}$, $R^{21}$ to $R^{36}$, m, n, o and p are as described regarding formula (d) and formula (C), and in order to bring about a structure represented by formula (4-1), for example, a compound described in formula (d) or formula (C) is preferably used.

Furthermore, the fourth poly(ester)carbonate of the present invention may be a polymer containing 70 mol % or more of the total of units represented by formula (4-1) and formula (2) based on all units.

In this case, the ratio of units represented by formula (4-1) and formula (2) is from 20 to 80:from 80 to 20, preferably from 25 to 75:from 75 to 25, more preferably from 30 to 70:from 70 to 30.

<Fifth Poly(ester)carbonate>

A fifth poly(ester)carbonate contains a repeating unit represented by the following formula (5):

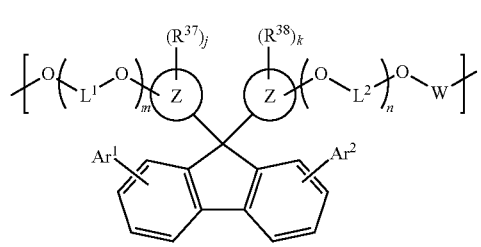

In the formula, the rings Z (the same or different) represent an aromatic group, each of $R^{37}$ and $R^{38}$ independently represents a hydrogen atom, a halogen atom or a hydrocarbon group having a carbon number of 1 to 12, which may contain an aromatic group, each of $Ar^1$ and $Ar^2$ represents an aromatic group having a carbon number of 6 to 10, which may contain a substituent, each of $L^1$ an $L^2$ is as described above and independently represents a divalent linking group, each of j an k is independently an integer of 0 or more, each of m and n independently represents 0 or 1, and W is as described above.

The reason why high refractive index, low birefringence and heat resistance can be balanced, which is the effect of the fifth poly(ester)carbonate, is considered as follows.

That is, from the relational expression of molecular structure and refractive index known as Lorentz-Lorenz equation, it is known that when the electron density of the molecule is increased and the molecular volume is decreased, the refractive index of a substance increases.

In particular, the firth poly(ester)carbonate makes it possible to obtain a resin having a higher refractive index, which has not been achieved by conventional techniques. Although the reason for this is not known, it is believed that an aromatic group introduced into a fluorene skeleton exhibits a low degree of free rotation in the molecule and the free volume of the polymer having this structure is smaller than a polymer having an aromatic group introduced into the polymer main chain, which is a known technique, as a result, the refractive index is increased (packing effect). The increase in the refractive index may correspondingly decrease the Abbe number. Among others, when aromatic groups are in a symmetrical positional relationship relative to the fluorene skeleton, the packing effect is thought to work more effectively.

In addition, the polymer has a fluorene skeleton having introduced thereinto an aromatic group and therefore, can exhibit sufficient heat resistance and also be balanced between birefringence and moldability.

The fluorene-based component unit constituting formula (5) is preferably contained in an amount of 5 mol % or more, more preferably 20 mol % or more, still more preferably 30 mol % or more, based on all units. When the content of the fluorene-based component unit constituting formula (5) is in the range above, a high refractive index is advantageously obtained. In addition, as for the upper limit, the unit is preferably contained in an amount of 100 mol % or less, more preferably 80 mol % or less, still more preferably 70 mol % or less. When the content of the fluorene-based component unit constituting formula (5) is in this range, the balance of refractive index, birefringence, heat resistance and moldability is advantageously excellent.

The fifth poly(ester)carbonate may be a polymer using, for example, a dicarboxylic acid or an ester-forming derivative thereof described regarding the first polyester carbonate and containing, for example, 70 mol % or more of a repeating unit of the following formula (5-1) based on all units:

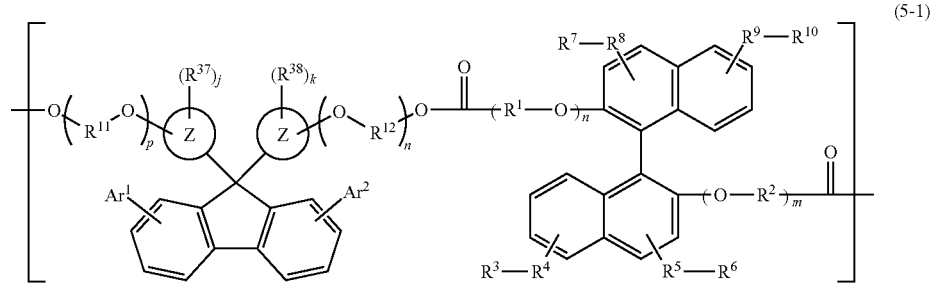

In formula (5-1), $R^1$ to $R^{12}$, $R^{37}$ to $R^{38}$, Z, $Ar^1$, $Ar^2$, m, n, o and p are as described regarding formula (e) and formula (C), and in order to bring about a structure represented by formula (5-1), for example, a compound described in formula (e) or formula (C) is preferably used.

Furthermore, the fifth polyester carbonate of the present invention may be a polymer containing 70 mol % or more of the total of a fluorene-based component unit and a binaphthyl-based component unit represented by formula (5-1) and formula (2) based on all units.

In this case, the ratio of units represented by formula (5-1) and formula (2) is from 20 to 80:from 80 to 20, preferably from 25 to 75:from 75 to 25, more preferably from 30 to 70:from 70 to 30.

<Sixth Poly(ester)carbonate>

As a sixth poly(ester)carbonate, a poly(ester)carbonate described in Patent Literature 2 where in formula (5) regarding the fifth poly(ester)carbonate, the ring Z is a fused polycyclic aromatic group, can also be mentioned.

As for the sixth poly(ester)carbonate, a compound where in formula (5) regarding the fifth poly(ester)carbonate, the ring Z is a naphthalene ring and $Ar^1$ and $Ar^2$ are selected from the same chemical groups as those of $R^{37}$ and $R^{38}$, is preferably used.

In addition, the sixth poly(ester)carbonate may be a polymer where in formula (5-1) regarding the fifth poly (ester)carbonate, the ring Z is a naphthalene ring and $Ar^1$ and $Ar^2$ are selected from the same chemical groups as those of $R^{37}$ and $R^{38}$.

Furthermore, the sixth poly(ester)carbonate may be a polymer containing 70 mol % or more of the total of a fluorene-based component unit and/or a binaphthyl-based component, where in formula (5-1) regarding the fifth polyester carbonate, the ring Z is a naphthalene ring and $Ar^1$ and $Ar^2$ are selected from the same chemical groups as those of $R^{37}$ and $R^{38}$, and a fluorene-based component unit and/or a binaphthyl-based component unit represented by formula (2) unit based on all units.

In this case, the ratio of the repeating unit and a unit represented by formula (2) is from 20 to 80:from 80 to 20, preferably from 25 to 75:from 75 to 25, more preferably from 30 to 70:from 70 to 30.

Preferably, in order to bring about a repeating unit described in the sixth poly(ester)carbonate, where in formula (5) regarding the fifth poly(ester)carbonate, the ring Z is a fused polycyclic aromatic group, for example, 9,9-bis [6-(2-hydroxyethoxy)-2-naphthyl]fluorene (hereinafter, sometimes simply referred to as BNEF) may be used.

<Additives>

The poly(ester)carbonate of the present invention can be used as a resin composition by appropriately adding, as needed, additives such as mold release agent, thermal stabilizer, ultraviolet absorber, bluing agent, antistatic agent, flame retardant, plasticizer and filler. As such additives, for example, those exemplified in Patent Literature 1 can be preferably used.

<<Optical Member>>

The poly(ester)carbonate of the present invention is transparent and excellent in the hue and therefore, is useful for various optical materials. For example, it can be used for a lens, a prism, an optical disc, a transparent conductive substrate, an optical card, a sheet, a film, an optical fiber, an optical film, an optical filter, a hardcoat film, etc. and, among others, is very useful for a lens.

In the case of producing an optical lens of the poly(ester) carbonate of the present invention by injection molding, the lens is preferably formed under the conditions of a cylinder temperature of 230 to 350° C. and a mold temperature of 70 to 180° C., more preferably formed under the conditions of a cylinder temperature of 250 to 300° C. and a mold temperature of 80 to 170° C. If the cylinder temperature is higher than 350° C., the poly(ester)carbonate undergoes decomposition to cause coloring, whereas if it is lower than 230° C., the molding is liable to become difficult because of high melt viscosity. In addition, if the mold temperature is higher than 180° C., this tends to make it difficult to take out a molded piece composed of the poly(ester)carbonate from the mold, whereas if the mold temperature is less than 70° C., the resin is excessively solidified fast in the mold during molding and it is likely to be difficult to control the shape of the molded piece or sufficiently transfer a pattern imparted on the mold.

Using the optical lens of the present invention in the form of an aspherical lens is favorably conducted. The aspherical lens can make the spherical aberration substantially zero by one lens, and the spherical aberration need not be removed by a combination of a plurality of spherical lens, as a result, the weight reduction and molding cost saving can be achieved. Accordingly, the aspheric lens is particularly useful as a camera lens among optical lenses In addition, the poly(ester)carbonate of the present invention has high molding fluidity and therefore, is useful in particular as a material of an optical lens having a thin-walled small and complicated shape. As for the lens size, specifically, the thickness of the central part is from 0.05 to 3.0 mm, preferably from 0.05 to 2.0 mm, more preferably from 0.1 to 2.0 mm, and the diameter is from 1.0 to 20.0 mm, preferably from 1.0 to 10.0 mm, more preferably from 3.0 to 10.0 mm. In addition, as the shape thereof, a meniscus lens in which one side is convex and another side is concave is preferred.

In the optical lens of the present invention, a lens composed of the poly(ester)carbonate is formed by any method of metallic molding, cutting, polishing, laser machining, electrical discharge machining, etching, etc. Among these, in view of production cost, metallic molding is preferred.

The present invention is more specifically described below by referring to Examples, however, the present invention is not limited thereto.

EXAMPLES (Measurement Method)
(1) Specific Viscosity:

A resin obtained after the completion of polymerization was thoroughly dried, and a specific viscosity ($\eta_{sp}$) at 20° C. of a solution prepared by dissolving 0.7 g of the resin in 100 ml of methylene chloride was measured. In the measurement, the falling time between marked lines of Ostwald viscosity tube in a constant temperature bath at 20±0.01° C. was measured, and the specific viscosity ($\eta_{sp}$) at 20° C. of the solution was determined according to the following formula.

$$\eta_{sp}=(t_1-t_0)/t_0$$

$t_1$: the falling time between marked lines of the polymer solution
$t_0$: the falling time between marked lines of methylene chloride (2) Hue:

1.0 g of a resin obtained after the completion of polymerization was dissolved in 5 ml of methylene chloride for spectroscopic analysis, and the b* value (yellow tinge) of the solution was measured by a spectrophotometer U-3310 manufactured by HITACHI.

Example 1

44.93 parts by mass of 2,2'-bis(2-hydroxyethoxy)-1,1'-binaphthyl (hereinafter, sometimes simply referred to as BHEB) and 43.85 parts by mass of 9,9-bis[4-(2-hydroxyethoxy)phenyl]fluorene (hereinafter, sometimes simply referred to as BPEF) used as the diols, 72.43 parts by mass of 2,2'-bis(carboxymethoxy)-1,1'-binaphthyl (hereinafter, sometimes simply referred to as BCMB) used as the ester-forming derivative, and 9.43 parts by mass of diphenyl carbonate (hereinafter, sometimes simply referred to as DPC) used as the carbonate ester were put in a reactor with a stirrer and a distillation device and after performing nitrogen purge three times, the jacket was heated at 200° C. to melt the raw materials. After the complete dissolution, the pressure was reduced to 40 kPa over 20 minutes, and the jacket was then heated to 240° C. at a rate of 60° C./hr. Thereafter, while holding the jacket at 240° C., the pressure was reduced to 26 kPa over 20 minutes. An esterification reaction of monomers was thus performed to obtain an intermediate product.

As the catalyst for polymerizing the obtained intermediate product and DPC, $38.9\times10^{-3}$ parts by mass of aluminum acetylacetonate (hereinafter, sometimes simply referred to as Al compound) and $85.4 \times 10^{-3}$ parts by mass of diethyl 3,5-di-tert-butyl-4-hydroxybenzylphosphonate (hereinafter, sometimes simply referred to as P compound 1) were added to the reactor.

After that, while holding the jacket at 240° C., the pressure was reduced to 0.13 kPa or less over 70 minutes. Subsequently, the jacket was heated to 250° C., and the polymerization reaction was performed until reaching a predetermined torque. After the completion of the reaction, the produced resin was withdrawn while pelletizing it to obtain polyester carbonate pellets.

Physical properties of the obtained resin are shown in Table 1.

Example 2

Polyester carbonate pellets were obtained by the same method as in Example 1 except that P compound 1 was changed to diethyl p-methylbenzylphosphonate (hereinafter, sometimes simply referred to as P compound 2) and the amount added was $58.1 \times 10^{-3}$ parts by mass. Physical properties of the obtained resin are shown in Table 1.

Example 3

Polyester carbonate pellets were obtained by the same method as in Example 1 except that P compound 1 was changed to diethyl benzylphosphonate (hereinafter, sometimes simply referred to as P compound 3) and the amount added was $54.8 \times 10^{-3}$ parts by mass. Physical properties of the obtained resin are shown in Table 1.

Example 4

Polyester carbonate pellets were obtained by the same method as in Example 1 except that BPEF was changed to 9,9-bis[4-(2-hydroxyethoxy)-3-phenylphenyl]fluorene (hereinafter, sometimes simply referred to as OPBPEF) and the amount added was 58.90 parts by mass. Physical properties of the obtained resin are shown in Table 1.

Example 5

Polyester carbonate pellets were obtained by the same method as in Example 1 except that BPEF was changed to 9,9-bis[4-(2-hydroxyethoxy)phenyl]-2,3-benzofluorene (hereinafter, sometimes simply referred to as BPEB) and the amount added was 48.82 parts by mass. Physical properties of the obtained resin are shown in Table 1.

Example 6

Polyester carbonate pellets were obtained by the same method as in Example 1 except that BPEF was changed to 9,9-bis[4-(2-hydroxyethoxy)phenyl]-2,7-diphenylfluorene (hereinafter, sometimes simply referred to as BPDP) and the amount added was 59.03 parts by mass. Physical properties of the obtained resin are shown in Table 1.

Example 7

Polyester carbonate pellets were obtained by the same method as in Example 1 except that BPEF was changed to 9,9-bis[6-(2-hydroxyethoxy)-2-naphthyl]fluorene (hereinafter, sometimes simply referred to as BNEF) and the amount added was 53.86 parts by mass. Physical properties of the obtained resin are shown in Table 1.

Example 8

175.40 parts by mass of BPEF used as the diol, 84.83 parts by mass of DPC used as the carbonate ester, and $38.9 \times 10^{-3}$ parts by mass of Al compound and $85.4 \times 10^{-3}$ parts by mass of P compound 1 used as the catalysts were put in a reactor with a stirrer and a distillation device and after performing nitrogen purge three times, the jacket was heated at 180° C. to melt the raw materials. After the complete dissolution, the pressure was reduced to 20 kPa over 20 minutes, and the jacket was then heated to 260° C. at a rate of 60° C./hr. Thereafter, while holding the jacket at 260° C., the pressure was reduced to 0.13 kPa or less over 70 minutes, and the polymerization reaction was performed until reaching a predetermined torque. After the completion of the reaction, the produced resin was withdrawn while pelletizing it to obtain polyester carbonate pellets. Physical properties of the obtained resin are shown in Table 1.

Comparative Example 1

Polymerization reaction was performed by the same method as in Example 1 except that phosphorus compound 1 was not used and the reaction time was continued for further 60 minutes, but the stirrer failed in reaching the predetermined torque, indicating that the polymerization did not proceed sufficiently. Physical properties of the obtained resin are shown in Table 1.

Comparative Example 2

Pellets of a polyester carbonate resin were obtained by the same method as in Example 1 except that and $6.8 \times 10^{-3}$ parts by mass of titanium tetrabutoxide (hereinafter, sometimes simply referred to as Ti-based catalyst) which is a normal catalyst in conventional techniques was used instead of using the catalyst of the present invention. Physical properties of the obtained resin are shown in Table 1.

Comparative Example 3

Polymerization reaction was performed by the same method as in Example 1 except that zinc acetate (hereinafter, sometimes simply referred to as Zn-based catalyst) which is used in the transesterification reaction of a polyester was used instead of using the catalyst of the present invention and the reaction time was continued for further 60 minutes, but the stirrer failed in reaching the predetermined torque, indicating that the polymerization did not proceed sufficiently. Even when the amount of zinc acetate and the type of the complex species were changed, the same results were obtained.

Comparative Example 4

Polymerization reaction was performed by the same method as in Example 1 except that manganese acetate (hereinafter, sometimes simply referred to as Mn-based catalyst) which is used in the transesterification reaction of a polyester was used instead of using the catalyst of the present invention and the reaction time was continued for further 60 minutes, but the stirrer failed in reaching the predetermined torque, indicating that the polymerization did not proceed sufficiently. Even when the amount of manganese acetate and the type of the complex species were changed, the same results were obtained.

In Examples 1 to 8, a polymer having a high molecular weight was obtained, and the obtained poly(ester)carbonate had excellent hue. In Comparative Examples 1, 3 and 4, a polymer having a high molecular weight was not obtained. In Comparative Example 2, a polymer having a high molecular weight was obtained, but the obtained polyester carbonate had poor hue.

The results are shown in Table 1 below.

|  |  | Example |  |  |  |  |  |  |  | Comparative Example |  |  |  |
|---|---|---|---|---|---|---|---|---|---|---|---|---|---|
|  |  | 1 | 2 | 3 | 4 | 5 | 6 | 7 | 8 | 1 | 2 | 3 | 4 |
| Diol [parts by mass] | BHEB | 44.93 | 44.93 | 44.93 | 44.93 | 44.93 | 44.93 | 44.93 | — | 44.93 | 44.93 | 44.93 | 44.93 |
|  | BPEF | 43.85 | 43.85 | 43.85 | — | — | — | — | 175.4 | 43.85 | 43.85 | 43.85 | 43.85 |
|  | OPBPEF | — | — | — | 58.9 | — | — | — | — | — | — | — | — |
|  | BPEB | — | — | — | — | 48.82 | — | — | — | — | — | — | — |
|  | BPDP | — | — | — | — | — | 59.03 | — | — | — | — | — | — |
|  | BNEF | — | — | — | — | — | — | 53.86 | — | — | — | — | — |
| Ester derivative [parts by mass] | BCMB | 72.43 | 72.43 | 72.43 | 72.43 | 72.43 | 72.43 | 72.43 | — | 72.43 | 72.43 | 72.43 | 72.43 |
| Carbonate ester [parts by mass] | DPC | 9.43 | 9.43 | 9.43 | 9.43 | 9.43 | 9.43 | 9.43 | 84.83 | 9.43 | 9.43 | 9.43 | 9.43 |
| Catalyst [×10⁻³ parts by mass] | Al Compound | 38.9 | 38.9 | 38.9 | 38.9 | 38.9 | 38.9 | 38.9 | 38.9 | 38.9 | — | — | — |
|  | P Compound 1 | 85.4 | — | — | 85.4 | 85.4 | 85.4 | 85.4 | 85.4 | — | — | — | — |
|  | P Compound 2 | — | 58.1 | — | — | — | — | — | — | — | — | — | — |
|  | P Compound 3 | — | — | 54.8 | — | — | — | — | — | — | — | — | — |
|  | Ti-Based catalyst | — | — | — | — | — | — | — | — | — | — | 6.8 | — |
|  | Zn-Based catalyst | — | — | — | — | — | — | — | — | — | — | — | 6.8 |
|  | Mn-Based catalyst | — | — | — | — | — | — | — | — | — | — | — | 6.8 |
| Physical properties | Specific viscosity | 0.23 | 0.23 | 0.21 | 0.23 | 0.22 | 0.21 | 0.18 | 0.25 | 0.007 | 0.23 | n.d. | n.d. |
|  | Tg [° C.] | 139 | 139 | 139 | 142 | 145 | 145 | 148 | 148 | n.d. | 139 | n.d. | n.d. |
|  | Refractive index | 1.672 | 1.672 | 1.672 | 1.676 | 1.683 | 1.684 | 1.685 | 1.637 | n.d. | 1.672 | n.d. | a.d. |
|  | Abbe number | 19.4 | 19.4 | 19.4 | 19.3 | 18.7 | 17.4 | 18.3 | 23.8 | n.d. | 19.4 | n.d. | n.d. |
|  | Δn [×10⁻³] | −0.3 | −0.3 | −0.3 | −0.5 | −0.9 | −1.2 | 1.9 | 1.0 | a.d. | −0.3 | n.d. | n.d. |
|  | b* | 1.2 | 1.8 | 1.9 | 2.0 | 2.3 | 2.3 | 2.1 | 0.8 | 1.5 | 4.5 | n.d. | n.d. |

The invention claimed is:

1. A method of producing a poly(ester)carbonate, comprising subjecting a diol and a carbonate ester to a transesterification reaction in the presence of a catalyst, wherein the catalyst comprises aluminum or a compound thereof, and a phosphorus compound, and
wherein the phosphorus compound is selected from the group consisting of diethyl 3,5-di-tert-butyl-4-hydroxybenzylphosphonate and diethyl p-methylbenzylphosphonate, and
wherein the poly(ester)carbonate comprises 50 mol % or more of a stereostructural component unit based on all units, and the stereostructural component unit comprises a repeating unit derived from a compound represented by the following formula (A):

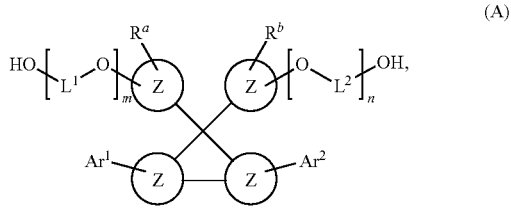

(A)

wherein:
the rings Z are each independently an aromatic group or a fused polycyclic aromatic group, each of $R^a$ and $R^b$ independently is a hydrogen atom, a halogen atom or a hydrocarbon group having a carbon number of 1 to 12 or a carbon number of 1 to 20, which optionally contain an aromatic group, each of $Ar^1$ and $Ar^2$ is a hydrogen atom or an aromatic group having a carbon number of 6 to 10, which optionally contain a substituent, each of $L^1$ an $L^2$ independently is a divalent linking group, m is 1, and n is 1.

2. The method according to claim 1, wherein the aluminum or a compound thereof is an aluminum salt, an aluminum alkoxide, or an aluminum chelate compound.

3. The method according to claim 1, wherein the carbonate ester is diphenyl carbonate.

4. The method according to claim 1, wherein the catalyst is used in an amount of $8 \times 10^{-5}$ mol or more and $1 \times 10^{-3}$ mol or less per mol of the total of all monomer units used.

5. The method according to claim 1, wherein in the poly(ester)carbonate, the b* value of a CIE1976 (L*a*b*) color system measured for a solution prepared by dissolving the poly(ester)carbonate at 13 mass % in methylene chloride (a solution prepared by dissolving 1.0 g of the poly(ester)carbonate in 5 ml of methylene chloride) is 2.5 or less.

* * * * *